(12) United States Patent
Gu et al.

(10) Patent No.: US 10,209,758 B2
(45) Date of Patent: Feb. 19, 2019

(54) GRAPHICS PROCESSING SYSTEM AND POWER GATING METHOD THEREOF

(71) Applicant: VIA Alliance Semiconductor Co., Ltd., Shanghai (CN)

(72) Inventors: Deming Gu, Shanghai (CN); Zhou Hong, Cupertino, CA (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 15/510,261

(22) PCT Filed: Dec. 12, 2014

(86) PCT No.: PCT/CN2014/093727
§ 371 (c)(1),
(2) Date: Mar. 10, 2017

(87) PCT Pub. No.: WO2016/090641
PCT Pub. Date: Jun. 16, 2016

(65) Prior Publication Data
US 2017/0308145 A1  Oct. 26, 2017

(51) Int. Cl.
*G06F 1/32* (2006.01)
*G06T 1/20* (2006.01)

(52) U.S. Cl.
CPC ............ *G06F 1/3206* (2013.01); *G06F 1/32* (2013.01); *G06F 1/3234* (2013.01); *G06T 2200/28* (2013.01); *Y02D 10/10* (2018.01)

(58) Field of Classification Search
CPC ..... G06T 1/20; G06T 2200/28; G06F 1/3206; G06F 1/3234; Y02B 60/12; G09G 2330/021
(Continued)

(56) References Cited

U.S. PATENT DOCUMENTS 6,938,176 B1 * 8/2005 Alben ................ G06F 1/10
713/300
8,949,645 B2   2/2015 Ahmad et al.
(Continued)

FOREIGN PATENT DOCUMENTS

CN    101615069 A    12/2009
CN    101908200 A    12/2010
(Continued)

OTHER PUBLICATIONS

International Search Report dated Jul. 31, 2015, issued in application No. PCT/CN2014/093727.
(Continued)

*Primary Examiner* — Jacinta M Crawford
(74) *Attorney, Agent, or Firm* — McClure, Qualey & Rodack, LLP

(57) ABSTRACT

A graphics processing system and power gating method thereof, the graphics processing system comprising: a graphics processing unit (GPU), a bus interface and a power management unit (PMU), the GPU comprising a control circuit and a plurality of partitions; the method includes: when the bus interface receives an external graphics command, utilizing the PMU to turn on a power supply of the control circuit; subsequently utilizing the control circuit to turn on power supplies of one or more partitions of the plurality of partitions corresponding to the external graphics command; when then control circuit detects any one of the plurality of partitions is in an idle state, utilizing the control circuit to turn off the power supply of the partition in the idle state; when the bus interface detects the plurality of partitions are in a full idle state, utilizing the bus interface to turn off the power supply of the control circuit via the PMU; and when the PMU turns off the power supply of the control (Continued)

circuit, the control circuit may also turn off the power supplies of the plurality of the partitions.

18 Claims, 2 Drawing Sheets

(58) Field of Classification Search
USPC .......................................................... 345/501
See application file for complete search history.

(56) References Cited

U.S. PATENT DOCUMENTS

| | | | |
|---|---|---|---|
| 9,035,956 B1* | 5/2015 | Schreyer | G06T 1/60 345/502 |
| 2005/0268141 A1 | 12/2005 | Alben et al. | |
| 2008/0034238 A1 | 2/2008 | Hendry et al. | |
| 2009/0096797 A1* | 4/2009 | Du | G06F 1/3203 345/506 |
| 2009/0265528 A1 | 10/2009 | Du et al. | |
| 2009/0295794 A1 | 12/2009 | Fan et al. | |
| 2011/0148887 A1* | 6/2011 | Chong | G06T 1/00 345/501 |
| 2012/0110352 A1 | 5/2012 | Branover et al. | |
| 2012/0249559 A1* | 10/2012 | Khodorkovsky | G06F 1/3203 345/502 |
| 2013/0038615 A1 | 2/2013 | Hendry et al. | |
| 2013/0063450 A1 | 3/2013 | Kabawala | |
| 2013/0155081 A1 | 6/2013 | Khodorkovsky et al. | |
| 2014/0089699 A1* | 3/2014 | O'Connor | G06F 1/324 713/322 |

FOREIGN PATENT DOCUMENTS

| | | |
|---|---|---|
| EP | 2 506 250 A2 | 10/2012 |
| TW | 201351124 A | 12/2013 |

OTHER PUBLICATIONS

Chinese language office action dated Jan. 25, 2016, issued in application No. TW 104120457.
European Search Report dated Apr. 24, 2018, issued in application No. 14907783.6-1216/3193235 PCT/CN2014093727.

* cited by examiner

GRAPHICS PROCESSING SYSTEM AND POWER GATING METHOD THEREOF

FIELD OF THE INVENTION

The present invention relates to a graphics processing system, and, in particular, to a graphics processing system and a power gating method capable of performing dynamic power gating.

BACKGROUND

In electronic devices such as computers and portable devices, the graphics processing unit (GPU) is always one of the components that consume the most power. Accordingly, it is a very crucial topic to reduce power consumption to increase the service life of the battery for better power management. In a conventional electronic device, the GPU is usually controlled by software. For example, the central processing unit (CPU) is utilized to retrieve system information and user preferences and make a determination based on statistical information. The power management unit of the GPU in a conventional electronic device may turn off or turn on the associated partitions in the GPU, such as partitions allowing powering off, based on different conditions.

However, the granularity for turning on/off the partitions in the GPU by software is very large. That is, the power gating of the partitions having a fine granularity cannot be controlled by software. In addition, the CPU has to execute a corresponding application for monitoring and determining the power status. This may cause power consumption, and the performance of the CPU is also a bottleneck. Accordingly, there is a demand for a graphics processing system to solve the aforementioned power-management issues.

BRIEF SUMMARY OF THE INVENTION

A graphics processing system is provided. The graphics processing system comprises a bus interface, a graphics processing unit, and a power management unit. The graphics processing unit comprises: a plurality of partitions; and a control circuit configured to control a power state of each partition and detect an idle state of each partition. The power management unit is configured to control power to the graphics processing unit. When the bus interface has received an external graphics processing command, the bus interface informs the power management unit to turn on the power to the control circuit, and the control circuit turns on the power to one or more of the partitions corresponding to the external graphics processing command after analyzing the external graphics processing command. The control circuit turns off the power to the partitions in the idle state when the control circuit has detected that one of the partitions is in the idle state. When the bus interface has detected that the partitions are in a full idle state, the bus interface turns off the power to the control circuit via the power management circuit.

A power gating method for use in a graphics processing system is provided. The graphics processing system comprises a graphics processing unit, a bus interface, and a power management unit, and the graphics processing unit comprises a control circuit and a plurality of partitions. The method comprises the steps of: utilizing the power management unit to turn off power to the control circuit when the bus interface has received an external graphics processing command; utilizing the control circuit to turn off power to the partitions corresponding to the external graphics processing command after utilizing the control circuit to analyze the external graphics processing command; utilizing the control circuit to turn off the power to the partitions in the idle state when the control circuit has detected that one of the partitions is in an idle state; and utilizing the bus interface to turn off the power to the control circuit via the power management unit when the bus interface has detected that the partitions are in a full idle state.

BRIEF DESCRIPTION OF THE SYMBOLS

100~graphics processing system;
110~bus interface;
111~second detection circuit;
120~power management unit;
130~graphics processing unit;
131~thermal sensor;
140~control circuit;
141~power control circuit;
142~first detection circuit;
151-154~partitions;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
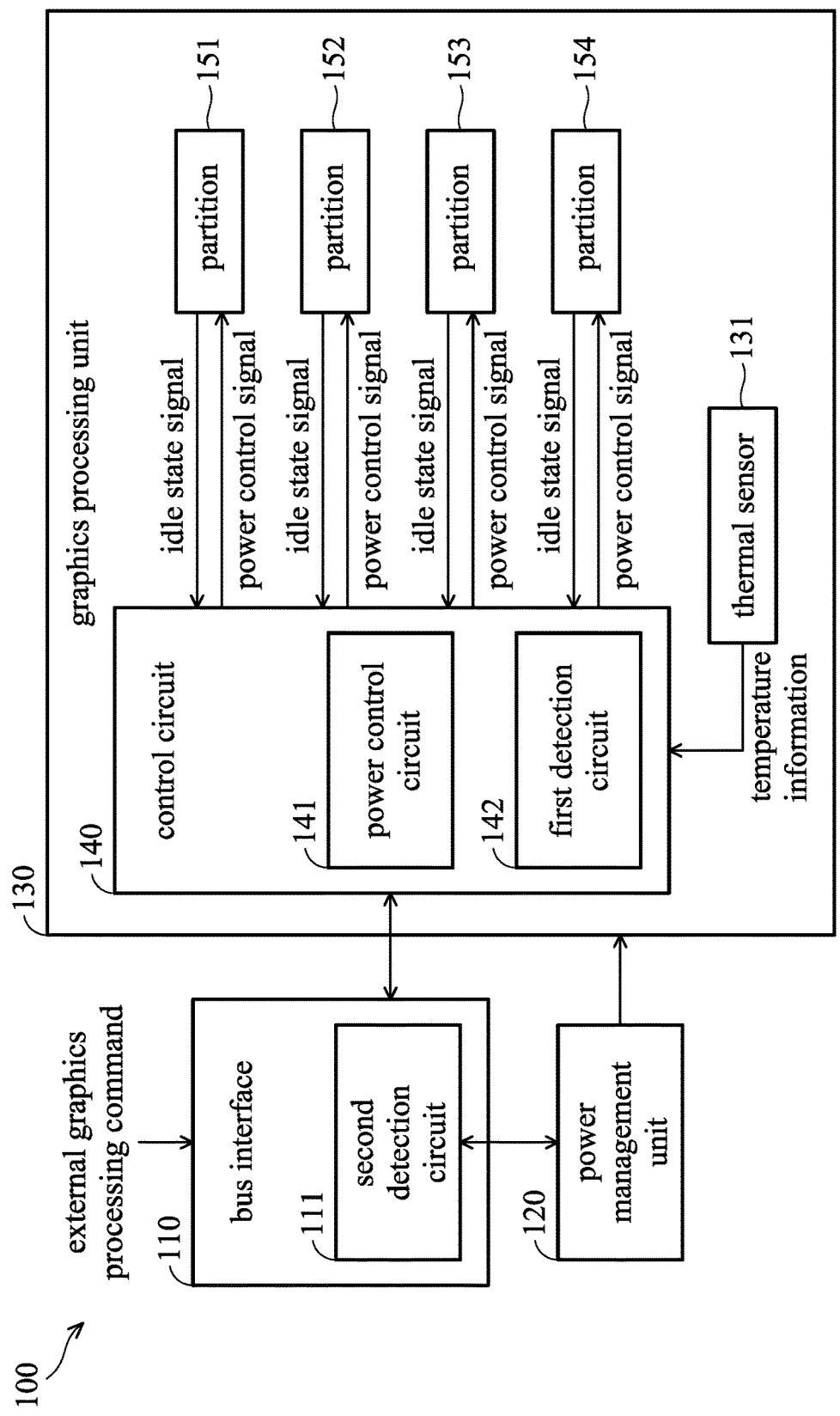
FIG. 1 is a block diagram of a graphics processing system in accordance with an embodiment of the invention.

FIG. 1 is a block diagram of a graphics processing system in accordance with an embodiment of the invention. As shown in FIG. 1, the graphics processing system 100 comprises a bus interface 110, a power management unit 120, and a graphics processing unit 130. The bus interface 110, coupled to the power management unit 120 and the graphics processing unit 130, is configured to receive an external graphics processing command from a CPU in the same electronic device with the graphics processing system 100 for example. The power management unit 120 is independent of the graphics processing unit 130, and is configured to control power gating of different partitions of the graphics processing unit 130. For example, the graphics processing unit 130 comprises a control circuit 140 and a plurality of partitions 151~154, wherein the partitions 151~154 can be turned on/off for power gating. It should be noted that the partitions 151~154 of the graphics processing unit 130 includes various hardware components for graphics processing, such as vertex shaders, pixel shaders, texture units, internal memories, bump mapping units, video decoding units, 3D computation units, or pipelines, slices, or blocks including the combination of the aforementioned components, but the invention is not limited thereto. That is, the partitions 151~154 are different physical hardware partitions in the graphics processing unit 130. In addition, the configurations of the partitions 151~154, such as corresponding computation functions or components, can be alternated according to various applications or computations.

The control circuit 140 is an always-on circuit. When the bus interface 110 has received the external graphics processing command to turn on the power to the control circuit 140, the control circuit 140 enters an always-on state. The control circuit 140 comprises a power control circuit 141 and a first detection circuit 142. The power control circuit 141 is configured to turn on/off power to the partitions 151~154 (e.g. via a power management signal of each partition). Generally, the direct memory access (DMA) buffers (not shown) of the graphics processing unit 130 stores instructions of the graphics processing unit 130, which can be accessed by the Windows Display Driver Model (WDDM) or the graphics processing unit 130. Each DMA buffer is dedicated for a command group currently performed by the same or different engines, and the power control circuit 141 may automatically turn on/off the power to unused partitions at the boundary at the boundary of the command group of each DMA buffer.

The first detection circuit 142 monitors the idle status of the partitions 151~154 according to an idle status signal reported by each of the partitions 151~154. In addition, the first detection circuit 142 also receives temperature information detected by a thermal sensor 131 in the graphics processing unit 130, and generates a full idle state signal corresponding to the graphics processing unit 130 according to the temperature information and the idle state signal from each partition.

In an embodiment, when the bus interface 110 has received an external graphics processing command from the CPU to turn on the graphics processing unit 130, the bus interface 110 firstly turns on the control circuit 140 of the graphics processing unit 130 via the power management unit 120. Then, the power control circuit 141 turns on/off power to the partitions associated with the external graphics processing command and configurations. Specifically, the first detection circuit 142 determines whether each partition is in an idle state according to the idle state signal from each partition. If one of the partitions is in the idle state, the first detection circuit 142 informs the power control circuit 141 to turn off the power to the associated partition.

In an embodiment, the bus interface 110 further comprises a second detection circuit 111, and the second detection circuit 111 is always-on (i.e. the power to the second detection circuit 111 is always on no matter the power status of the control circuit 140 or the partitions 151~154) for simultaneously receiving external graphics processing commands. The second detection circuit 111 also detects the idle status of the graphics processing unit 130. When the second detection circuit 111 has detected that the graphics processing unit 130 is in the full idle state (e.g. all the partitions 151~154 are in the idle state), the second detection circuit 111 informs the power management unit 120 to turn off the power to the control circuit 140 to reduce power consumption of the graphics processing system 100.

In another embodiment, when the power management unit 120 is to turn off the power to the control circuit 140, the control circuit 140 also turns off the power to the corresponding partitions.

Figure 2:
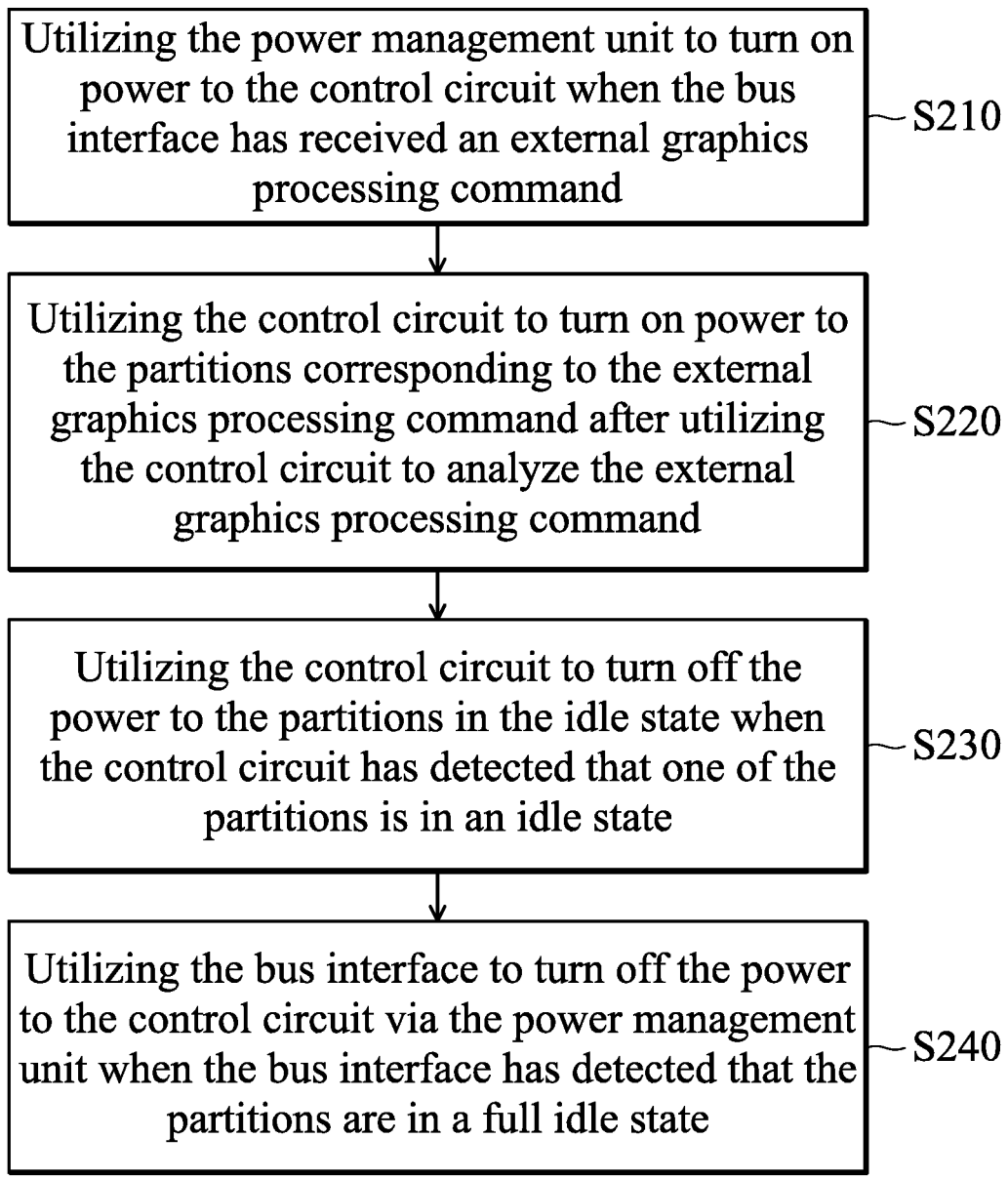
FIG. 2 is a flow chart of a power gating method in accordance with an embodiment of the invention.

FIG. 2 is a flow chart of a power gating method in accordance with an embodiment of the invention. As shown in FIG. 2, in step S210, when the bus interface 110 has received an external graphics processing command (e.g. from a CPU), the bus interface 110 turns on the power to the control circuit 140 via the power management unit 120. In step S220, the control circuit 140 turns on the power to the partition associated with the external graphics processing command after the control circuit 140 analyzes the external graphics processing command. In step S230, the control circuit 140 turns off the power to the partitions in the idle state when the control circuit 140 has detected that one of the partitions is in the idle state. In step S240, when the bus interface 110 has detected that all the partitions of the graphics processing unit is in a full idle state, the bus interface 110 turns off the power to the control circuit 140 via the power management unit 120. In another embodiment, when the power management unit 120 is to turn off the power to the control circuit 140, the control circuit 140 turns off the power to the partitions correspondingly.

In view of the above, a graphics processing system is provided. The graphics processing system is capable of monitoring the idle state of each partition in the graphics processing unit, and turning off power to the partitions which are in the idle state. In addition, the graphics processing system is further capable of monitoring whether the graphics processing unit is in a full idle state, and turning off the power to the graphics processing unit when the graphics processing unit is in the full idle state, thereby reducing power consumption. Specifically, the graphics processing system in the invention solves the deficiencies of performing power gating by software in the prior arts. The graphics processing system turns on/off power to different partitions individually to efficiently reduce power consumption and to reduce the overhead of the CPU's performance.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing system, comprising:
a bus interface, configured to receive an external graphics processing command;
a graphics processing unit, comprising:
a plurality of partitions; and
a control circuit configured to control a power state of each partition and detect an idle state of each partition; and
a power management unit configured to control power to the control circuit of the graphics processing unit,
wherein the bus interface is external to the graphics processing unit,
wherein when the bus interface has received the external graphics processing command, the bus interface informs the power management unit to turn on the power to the control circuit, and the control circuit turns on the power to one or more of the partitions corresponding to the external graphics processing command after the control circuit analyzes the external graphics processing command,
wherein the control circuit turns off the power to the partitions in the idle state when the control circuit has detected that one of the partitions is in the idle state,
wherein when the bus interface has detected that the partitions are in a full idle state, the bus interface turns off the power to the control circuit via the power management circuit.

2. The graphics processing unit as claimed in claim 1, wherein the control circuit is in an always-on state after the power management unit turns on the power to the control circuit, and the control circuit further turns off the power to the partitions when the power management unit turns off the power to the control circuit.

3. The graphics processing unit as claimed in claim 2, wherein the control circuit comprises a first detection circuit for turning on the power to one or more of the partitions after analyzing the external graphics processing command.

4. The graphics processing unit as claimed in claim 1, wherein the graphics processing unit comprises a thermal sensor for detecting temperature information of the graphics processing unit.

5. The graphics processing unit as claimed in claim 4, wherein the control circuit generates a full idle state signal according to the temperature information from the thermal sensor and an idle state signal from each partition.

6. The graphics processing unit as claimed in claim 1, wherein the bus interface comprises a second detection circuit, and the second detection circuit is always-on for simultaneously receiving the external graphics processing command and informs the power management unit to turn on the power to the control circuit.

7. The graphics processing unit as claimed in claim 6, wherein the second detection circuit determines whether the graphics processing unit is in the full idle state according to a full idle state signal from the control circuit.

8. A power gating method for use in a graphics processing system, wherein the graphics processing system comprises a graphics processing unit, a bus interface, and a power management unit, and the graphics processing unit comprises a control circuit and a plurality of partitions, the method comprising:
utilizing the power management unit to turn on power to the control circuit when the bus interface, which is external to the graphics processing unit, has received an external graphics processing command;
utilizing the control circuit to turn on power to the partitions corresponding to the external graphics processing command after utilizing the control circuit to analyze the external graphics processing command;
utilizing the control circuit to turn off the power to the partitions in the idle state when the control circuit has detected that one of the partitions is in an idle state; and
utilizing the bus interface to turn off the power to the control circuit via the power management unit when the bus interface has detected that the partitions are in a full idle state.

9. The method as claimed in claim 8, wherein the graphics processing unit comprises a thermal sensor for detecting temperature information of the graphics processing unit.

10. The method as claimed in claim 9, further comprising:
utilizing the control circuit to generate a full idle state signal according to the temperature information from the thermal sensor and an idle state signal from each partition.

11. The method as claimed in claim 10, wherein the bus interface comprises a detection circuit, and the method further comprises:
utilizing the detection circuit to determine whether the graphics processing unit is in the full idle state according to the full idle state signal from the control circuit.

12. The method as claimed in claim 8, wherein the control circuit is in an always-on state after the power management unit turns on the power to the control circuit, and the control circuit further turns off the power to the partitions when the power management unit turns off the power to the control circuit.

13. A power gating method for use in a graphics processing system, wherein the graphics processing system comprises a graphics processing unit and a bus interface, the graphics processing unit comprises a control circuit and a plurality of partitions, the method comprising:
turning on power of the control circuit by the bus interface when the bus interface external to the graphics processing unit receives an external graphics processing command, wherein the control circuit is in an always-on state until a full idle state is detected;
turning on power of the partitions associated with the external graphics processing command by the control circuit; and
turning off the power of the partitions being detected in an idle state by the control circuit.

14. The method as claimed in claim 13, further comprising:
generating a full idle state signal according to a temperature information from a thermal sensor and an idle state signal from each partition.

15. The method as claimed in claim 14, wherein the bus interface comprises a detection circuit to determine whether the graphics processing unit is in the full idle state.

16. The method as claimed in claim 13, further comprising a power management unit which is independent of the graphics processing unit to turn on or turn off the power of the control circuit.

17. The method as claimed in claim 13, wherein the bus interface comprises an always-on detection circuit for turning on the power of the control circuit no matter a power status of the control circuit.

18. The method as claimed in claim 13, further comprising analyzing the external graphics processing command before turning on power of the partitions associated with the external graphics processing command.

* * * * *